United States Patent [19]

Matt

[11] Patent Number: 4,899,615
[45] Date of Patent: Feb. 13, 1990

[54] DEVICE FOR ASSEMBLING A CAM MEMBER WITH A CAM SHAFT

[75] Inventor: Lukas Matt, Eschen, Fed. Rep. of Germany

[73] Assignee: Etablissement Supervis

[21] Appl. No.: 290,849

[22] Filed: Dec. 28, 1988

Related U.S. Application Data

[63] Continuation of Ser. No. 916,289, Oct. 7, 1986, abandoned.

[30] Foreign Application Priority Data

Oct. 11, 1985 [DE] Fed. Rep. of Germany ....... 3536296

[51] Int. Cl.$^4$ ........................................... F16H 53/00
[52] U.S. Cl. ..................................... 74/567; 403/272; 228/56.3; 228/154
[58] Field of Search .............. 74/567; 123/90.34, 90.6, 123/90.17; 403/372, 365, 272, 268, 273, 282; 228/56.3, 253, 255, 154

[56] References Cited

U.S. PATENT DOCUMENTS

| | | | |
|---|---|---|---|
| 607,504 | 7/1898 | Crowther | 228/56.3 |
| 637,046 | 11/1899 | Taylor | 403/272 |
| 1,390,949 | 9/1921 | Yassenoff | 74/567 |
| 2,440,298 | 4/1948 | Ronay et al. | 403/271 X |
| 3,438,660 | 4/1969 | Steiner | 403/372 X |
| 3,667,109 | 6/1972 | Alcenius | 403/272 X |
| 3,700,271 | 10/1972 | Blaurock et al. | 403/372 |
| 3,838,928 | 10/1974 | Blaurock et al. | 403/372 |
| 3,999,277 | 12/1976 | Hamada | 74/567 X |
| 4,265,388 | 5/1981 | Takahashi et al. | 29/525 X |

FOREIGN PATENT DOCUMENTS

| | | | |
|---|---|---|---|
| 106838 | 11/1899 | Fed. Rep. of Germany | 74/567 |
| 2336241 | 2/1975 | Fed. Rep. of Germany | |
| 2838995 | 3/1979 | Fed. Rep. of Germany | |
| 3321846 | 12/1983 | Fed. Rep. of Germany | |
| 3227693 | 1/1984 | Fed. Rep. of Germany | |
| 3247636 | 6/1984 | Fed. Rep. of Germany | |
| 3301749 | 8/1984 | Fed. Rep. of Germany | |
| G8426999 | 12/1984 | Fed. Rep. of Germany | |
| 56-23372 | 3/1981 | Japan | 228/154 |
| 61-74965 | 4/1986 | Japan | 74/567 |
| 61-202771 | 9/1986 | Japan | 74/567 |
| 223300 | 10/1924 | United Kingdom | 403/272 |
| 687691 | 2/1953 | United Kingdom | 403/365 |
| 2133104 | 7/1984 | United Kingdom | 74/567 |

Primary Examiner—Rodney M. Lindsey
Attorney, Agent, or Firm—Toren, McGeady & Associates

[57] ABSTRACT

A cam member is formed with an axial bore slightly larger than the outer diameter of a cam shaft so as to enable easy insertion of the cam shaft therein when forming an assembly. A recess is provided between the axial bore and the cam shaft and a joinder piece is inserted in the recess with solder being retained in the joinder piece so that upon heating of the solder with the joinder piece located within the recess means, the cam member and the shaft member may be affixed together.

1 Claim, 2 Drawing Sheets

DEVICE FOR ASSEMBLING A CAM MEMBER WITH A CAM SHAFT

This is a continuation of Ser. No. 916,289, filed Oct. 7, 1986, now abandoned.

The invention is generally directed to cam shaft assemblies particularly useful for internal combustion engines and more particularly to an assembly wherein a cam member and a cam shaft are rigidly joined together by a soldering operation.

Cam shafts for internal combustion engines wherein a cam member and a shaft are separately fabricated and then joined together to form a unitary component are known, for example, from German Disclosure Publications DE-OS 28 38 995 and DE-OS 33 21 846. In known structures of this type, a shaft is provided with several axially extending grooves and the bore of a cam member which is to be attached to the shaft is arranged to comprise for this purpose a radial projection which engages into the groove, whereby the bore of the cam surrounds the shaft with some clearance and wherein the projection is dimensioned to be so large in its radial extent that cams and shafts are joined together with frictional locking forces and are in interengagement with each other. The depth existing because of the clearance mentioned above is filled from the outside from brazing solder after the cam member and the shaft have been joined together. The number of grooves which may be machined on the external contour of the shaft coincide with the number required by the cam phase position for the respective utilization purpose.

It has been found that prior art designs of this type are impractical inasmuch as cumbersome work processes are required in order to machine the bores of the cams with the inwardly protruding radially aligned projections. These projections must not only be machined very accurately as far as their radial dimensions are concerned, but they must also be very accurately positioned insofar as their angular location with respect to the axis of the cam member is concerned.

In another type of prior art device disclosed, for example, in German Disclosure Publications DE-OS 32 47 636, DE-OS 33 01 749 and DE-OS 32 27 693, the cams are placed upon a shaft exhibiting rotationally symmetrical cross sections and are shrunk on with a force fit. In order that such a shrink fit can assure sufficient retention during operational loading of the cam shaft, the parts which are to be paired must have a force or press fit. This means that during fabrication of the crank shaft, the cam must be pushed with a great force across nearly half the length of the shaft. As a result, it is difficult to avoid damage to that portion of the shaft which is traversed by the cam and the damage which occurs to the shaft surface causes any subsequent cam which must also be pushed over this region to encounter altered tolerance fit conditions.

In accordance with DE-GM 84 26 999, there is further known a cam shaft with a support tube constituting the shaft and with cam disks which are placed by sliding onto the shaft and connected therewith in a locked manner. The cam disks comprise an aperture corresponding to the support tube external cross section and the external side of the support tube at least in the region of the cam disks and the aperture wall of the cam disks are metallic. Joining of the cam disk and the support tube is effected by means of laser welding or laser soldering. In such an arrangement, the cam disks and the support tube are laser welded or laser soldered from the inside of the support tube. In such a laser welding or soldering arrangement, the aperture wall of the cam disks and the circumferential regions of the support tube surrounded by the cam disks may consist of materials suitable for soldering. However, it is also possible to insert a soldering foil between the cam disks and the support tube or to arrange rings consisting of solder on the support tube on both sides of the cam disk.

Of course, it is clear that high quality metallic connections can be produced with laser beams. However, this type of joint is technologically viewed as rather expensive and is scarcely available for use in practice during mass production. In this known design, it has been the practice to either conduct the laser beams around the shaft or to rotate the shaft and the cam disks with respect to the laser beam whereby a portion of the normal difficulties which may be expected may result. Furthermore, the surface of the shaft or of the support tube must be subjected to some degree to a finishing process, or possibly, additionally copper plated. In the fabrication of the cam shaft, it is necessary to be attentive to the fact that apart from a solid connection between the shaft and the cam member, the cam member must be positioned at a desired angle so that the finished shaft assembly need not be subsequently machined. In order to fix the cam members with respect to the shaft in their axial direction as well as in a mutual angular position prior to the joinder process, this type of prior art arrangement provides a shell-shaped device in which the shafts with the cams are placed. In this case, however, it is only possible to weld or solder from the inside of the shaft which presupposes that the shaft is designed as a hollow tube and that the laser cannon is equipped in such a way that the laser beam can be redirected through an angle of at least 90°. This assumes extraordinarily expensive technological apparatus which can only be utilized in a laboratory and which is not suitable for mass production in a factory.

SUMMARY OF THE INVENTION

The present invention may be described as comprising a cam shaft assembly, wherein a shaft member is formed with an outer diameter which is slightly larger than an axial bore formed in at least one cam member which is to be rigidly attached to the shaft by a soldered connection. As a result, the shaft member may be easily inserted into the bore in the cam member with a loose fit during assembly. Recess means are formed within the axial bore in the cam member between the cam member and the shaft member and joinder means including solder are located within the recess means for fixing the cam member and the shaft member together. In accordance with the invention, the joinder means comprise an annular piece having solder receptor means therein for holding solder in place during assembly of the shaft member and the cam member. The annular piece is formed with resilient characteristics and has an unstressed diameter which is slightly larger than the diameter of the axial bore in the cam member so that a press fit is effected with the cam member during assembly with the shaft member. After the cam member and the shaft member have been placed in assembly position with the annular piece located within the recess means, heat is applied to the solder and a joinder operation is effected.

As a result of the present invention, fabrication of such a cam shaft assembly is simplified, and, simultaneously, the quality thereof is improved. This is accomplished in that the annular piece which is inserted into the recess means is formed preferably with longitudinal slots which provide the receptor means for the solder. The receptor means may comprise hollows, pockets, depressions, or the like, into which solder, preferably pasty solder, is introduced. The external diameter of the annular piece inserted into the recess means or its external enveloping circle is made to be slightly greater than the diameter of the axial bore in the cam so that a press fit will exist between the cam member and the shaft.

As a result of the invention, the shaft member will require no special surface processing, such as grinding and/or copper plating. A relatively rough fit is sufficient between the axial bore in the cam member and the cross-sectional contour of the shaft member so that the cam member can be moved by sliding onto the shaft without requiring any significant force so that it may be easily seated in place for the assembly operation. Because of the annular piece, and its dimensions with respect to the shaft, the cam member is provided with a solid seating engagement upon the shaft and may thus be positioned at a correct angle without any auxiliary means. The solder provided for the joint is already arranged in or at the annular carrier or support piece and, thus, solder supply and solder metering problems are obviated. An additional advantage of utilizing such a preferably elastic solder annular support piece consists in that such an annular member or ring will center the cam upon the shaft and therefore enable achievement of a constant soldering gap. This constant soldering gap is essential for high quality attachment. Additionally, required expenditure for furnishing or grinding of the cam members is held to an absolute minimum by such a centering process.

Of course, it is of particular advantage that due to the press fit which is provided by the annular piece between the cam member and the shaft member, the cam members may be held aligned in place both axially and angularly without displacement during the assembly and soldering operation so as to avoid inaccurate location of the parts.

The shaft prepared in this manner is then placed in a kiln and is heated to the extent that the solder liquifies and distributes itself. This may be accomplished without requiring special measures to retain the cam members in their predetermined correct angular positions. Thus, the assembly process is considerably simplified, and also, the fabrication arrangement is simplified because the cam member retains its angularly correct position with respect to the shaft even if it is repeatedly manipulated as a consequence of the fusion of the solder. The workpiece prepared in this manner may be hung in a kiln and may be subsequently heated therein. During the heating operation and subsequent cooling, no special measures are required for establishing an angularly correct position for the cam members. Tests have shown no technological difficulties in applying the solder required for joinder at or in the annular support or carrier piece, and, thus, the process can be automated with simple means.

The various features of novelty which characterize the invention are pointed out with particularity in the claims annexed to and forming a part of this disclosure. For a better understanding of the invention, its operating advantages and specific objectives attained by its use, reference should be had to the drawings and descriptive matter in which there are illustrated and described the preferred embodiments of the invention.

DETAILED DESCRIPTION OF THE PREFERRED EMBODIMENTS

Figure 1:
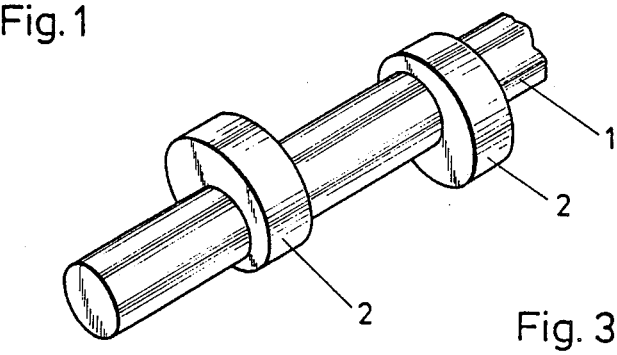
FIG. 1 is a perspective view showing a cam shaft assembly of the type manufactured in accordance with the present invention.
Figure 11:
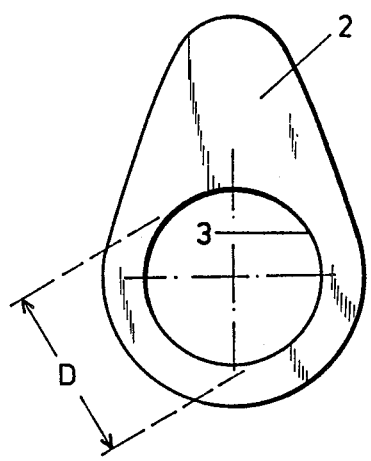
FIG. 11 is a plan view of a cam member.
Figure 10:
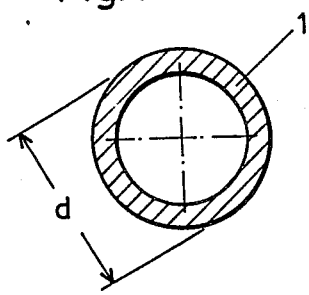
FIG. 10 is a sectional view of the shaft member.

Referring now to the drawings, and more particularly to FIG. 1, there is shown a cam shaft assembly which has been formed in accordance with the present invention. The assembly of FIG. 1 comprising a shaft member 1 consisting essentially of a tubular member and a pair of cam members 2 which are fastened to the shaft member 1 and which are spaced from each other in the axial direction of the shaft 1. The cam members 2 are also angularly offset relative to each other to correspond with a respective phase position of elements of an engine to be actuated within which the cam shaft assembly has been provided. The tubular shaft member 1, as best seen in FIG. 10, comprises a circular annular cross section and, as seen in FIG. 11, the cam member 2 within which the shaft 1 is received is formed with a circularly shaped axial bore 3.

The cam member 2 may be produced by a sintering process or it may be stamped from suitable material. Other types of production techniques are also available for manufacture of the cam member.

The axial bore 3 in the cam member 2 is formed with a diameter D which is slightly greater than an outer diameter d of the shaft member 1. Thus, the shaft member 1 may be inserted into the bore 3 and/or the cam member 2 may be moved by sliding upon the shaft 1 without any particular expenditure of force because of the existing play. The fit of the bore 3 and the shaft 1 lies appropriately in the tolerance range of H7 - H11 or h8 - h11.

Figure 2:
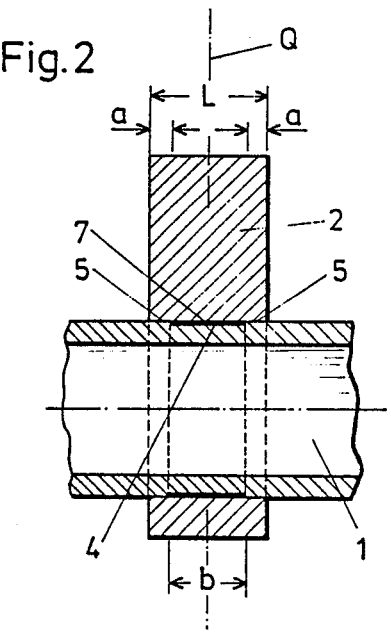
FIG. 2 is a sectional view showing the cam shaft assembly in accordance with the invention in the region of the cam member after joinder of the parts.
Figure 3:
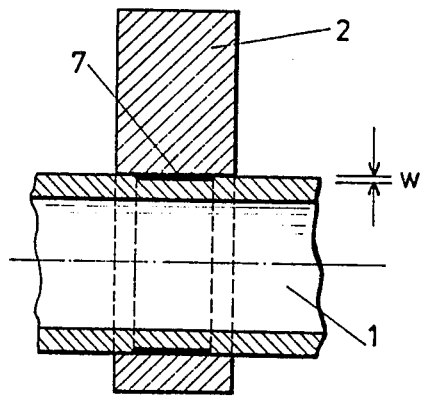
FIG. 3 is a similar sectional view showing the assembly after an additional processing and machining step.

At the location at which the cam member 2 is to be fastened upon the shaft 1 and is to be attached thereon, the shaft 1 comprises a circular groove or recess 4 having an axial length b measured in the axial direction of the shaft 1, with the length b being smaller than the axial length L of the bore 3. Thus, the cam member 2, as seen in FIGS. 2 and 3, is so oriented with respect to the recess 4 that the walls of the bore 3 will project beyond the recess 4 on both sides thereof by approximately an equal amount a. Thus, the bore 3 is arranged to be approximately symmetrical with respect to a cross-sectional plane Q which is centrally located with respect to the recess 4. The recess 4 may, however, also be provided in the wall of the bore of the cam 2 or it may be partially provided in both of the parts 1 and 2 which are to be paired together. However, this latter arrangement would appear to be less desirable due to fabrication or technological reasons.

Prior to sliding on and positioning of the cam member 2 in the manner described upon the shaft 1 during fabrication and assembly of the cam shaft assembly, solder is introduced into the recess 4. This solder is capable of being liquified by fusion. Appropriately hard or brazing solder is used here. Experience has shown that handling of pasty masses during assembly in the course of industrial mass production is not desirable. In order to facilitate handling of the materials, it has been provided in the invention to utilize a support piece for the pasty mass of solder which is designed as a longitudinally slotted, annularly-shaped carrier piece having pockets therein for receiving the solder 7, which pockets, therefore, act as solder receptor means.

Figure 4:
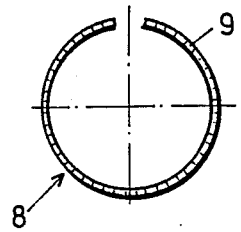
FIGS. 4, 5 and 6 are schematic views showing in plan view, side view and cross section, respectively, an annular support piece having solder receptor means.
Figure 5:
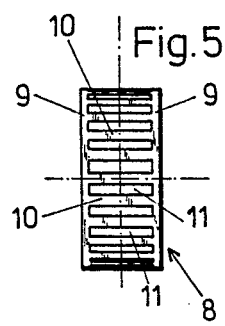
Figure 6:
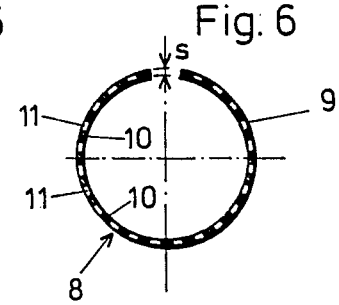

The support piece which is utilized with the present invention may comprise an annular member or piece 8 shown in FIGS. 4–6. This annular piece 8 is formed on its edges with annularly shaped webs or lands 9 which are connected with each other by spaced apart bars 10. The annular piece 8 may, for example, be stamped from a metal strip of appropriate thickness s and subsequently it may be bent into its annular shape. Hollow spaces or recesses 11 are provided between the individual bars 10 and the spaces 11 operate as solder receptor means which may be filled with solder, for example, in a proprietary automated work process. Then, also, this originally, longitudinally extended strip or annular piece 8 is bent into a slotted ring as shown in FIGS. 4–6.

The annular support piece 8 prepared as shown in the drawings is then somewhat widened or expanded during installation and is inserted laterally into the recess 4 in the shaft 1. Subsequently, the cam member 2 is placed onto the shaft 1 by sliding the shaft 1 through the bore 3. The thickness s of the annular support piece 8 is adapted to the height or radial depth w of the recess 4 in such a way that sliding on of the cam 2 onto the support piece 8 which is filled with solder is possible only under the effect or expenditure of force. In the annular piece 8 of the type illustrated in FIGS. 4–8, additional design measures must be provided in the region of the side webs or lands 9 if the piece 8 is of an appropriately thick dimension in order to achieve a press fit between the tubular shaft member 1 and the cam member 2. This, in order to enable and assure the sidewise escape of the solder 7 which is to be fused into the capillary-shaped annular gaps 5 (see FIG. 2).

Figure 7:
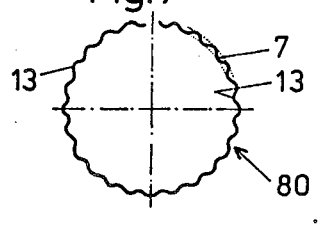
FIGS. 7 and 8 show, respectively, in plan view and in side view, another embodiment of the annular support piece with the solder receptor means.
Figure 8:
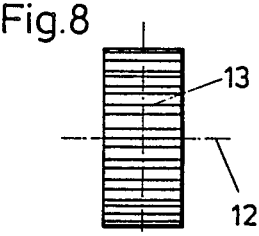

This additional effort with a support piece according to FIGS. 4–6 can be countered if a spring steel strip bent to form an open or slotted ring is utilized as a support piece 80, as shown in FIGS. 7 and 8, the annular piece 80 being a corrugated or undulated member wherein the axes of the undulations or corregations 13 extend essentially parallel to an axis 12 of the annular piece 80. The flutes or concavities which extend parallel to the axis 12 formed in the annular piece 8 operate as solder receptor means for receiving pasty solder and the flutes which are open sidewise or laterally assure a secure outflow of liquified solder when the cam shaft assembly is placed into a kiln during assembly. Again, it should be noted that the height or radial depth of the corrugations 13 is adapted to the depth or radial width w of the recesses 4 so that the cam 2 must be moved in sliding engagement on the shaft 1 with the application of some force after the annular piece 80 is placed into the recess 4. Accordingly, in the region of attachment or overlapping between the cam member 2 and the shaft member 1, there results a press fit between these parts which enables at least temporary adjustment and fixing of the cam member so that it will be held securely in place and not dislodged until the solder is fused or has again hardened.

Because of the utilization of spring steel formed in the desired shape for the annular support piece 80 in connection with the solder 7, the press fit can be constructed in such a manner that frictional forces thus generated may absorb a significant share of the stresses occurring during operation. In order to facilitate assembly of the cam when such a support piece fabricated from undulated or corrugated steel is used, the edges of the support piece are flattened or chamfered in a wedge-shaped manner. As will be noted in both FIGS. 4 and 6, as well as in FIG. 7, the annular piece 8 or 80 is formed so as to be discontinuous circumferentially. Thus, it will be noted that the two ends of the annular piece, for example, the piece 80 as shown in FIG. 7, are illustrated as spaced from each other. However, it should be noted that when the annular piece 80 is in the unstressed condition, the free ends should somewhat overlap so that when the piece 80 is placed about the shaft member 1, a resilient spring force will tend to engage the piece 80 on the shaft 1. For reasons of clarity, however, the annular piece 80 in FIG. 7 has been shown as an open ring.

In connection with the support piece 8 which is shown and described with reference to FIGS. 4–6, it should be noted that the cross section of the ;metal strip from which the annular piece is bent comprises approximately a slightly wedge-shaped taper which facilitates installation of the cam.

Figure 9:
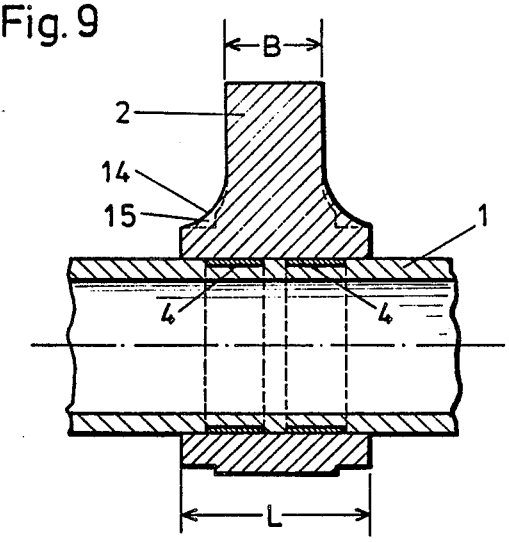
FIG. 9 is a sectional view showing an embodiment somewhat different from that shown in FIGS. 2 and 3.

In order to achieve as thorough and secure a connection as possible between the cam member 2 and the shaft 1, there may be provided a plurality of recesses 4 as shown in FIG. 9, wherein two recesses for each cam member 1 are provided. Furthermore, the cam member 2 as shown in FIG. 9 may be formed with an appropriately broadened footing or radially innermost portion, whereby the length L of the bore 3 in the cam member 2 will be somewhat larger than the width B of the projection portion of the cam member.

In case of such a widened footing of the cam member, it is possible to construct the sidewise projecting shoulder 14 in such a way that it can serve as a bearing surface for the cam shaft. The broken line 15 shown in FIG. 9 indicates this possibility.

The cam assembly prepared in the manner described and arranged with the cam member 2 appropriately radially positioned on the shaft member 1 is then heated in a kiln preferably in a vacuum kiln up to liquification temperatures of the solder, approximately 620°–1100°C. The solder heated in this manner and mixed with a flux agent liquifies and joins the two parts together, whereby the liquified solder will migrate into the capillary and annular gaps 5 formed by the narrow fit between the shaft 1 and the cam member 2, thereby to fill this gap. THus, after cooling of the cam shaft assembly, it will be assured that an optimum connection will be provided.

FIG. 3 shows in longitudinal section the cam shaft assembly after fusion and subsequent to cooling of the solder which has flowed into the aforementioned capillary annular gap 5 and wherein the solder has solidified.

Thus, in summary, it will be seen that the present invention provides a cam shaft assembly which is designed of several parts and which consists of the shaft member 1 and the cam member 2 which are produced by different fabrication processes separate from each other. The cam members 2, for example, may be fabricated from sintered material and the diameter of the axial bore in the cam 2 is selected to be slightly larger than the diameter d of the shaft 1 so that the cam may be moved by siding upon the shaft into a position provided without any particular effort. A recess 4 may be provided either in the wall of the bore of the cam member 2 or it may be provided at a location on the shaft member 1 where the cam is to be fastened. Solder 7 is introduced into the recess 4 and subsequently after adjustment of the cam member 2, the cam shaft assembly prepared in this manner is heated preferably in a vacuum kiln until the solder 7 becomes fluid and fills the capillary gap 5 between the wall of the bore 3 and the surface of the shaft 1. If the solder 7 is used in a pasty form, then it is appropriate to provide a support piece for facilitating handling of the solder and the support piece is constructed as a longitudinally slotted annulus exhibiting solder receptor means, such as pockets, recesses, or hollows, into which the solder may be introduced. The radial thickness of the annular piece may be dimensioned in such a way that it projects slightly beyond the radial depth of the recess 4 so that the cam must be moved in sliding engagement upon the shaft 1 by the application of a force so that this component not only serves as storage space for the solder, but also for enabling at least temporary adjustment and retention of the cam member 2 in position with respect to the shaft member 1.

While specific embodiments of the invention have been shown and described in detail to illustrate the application of the inventive principles, it will be understood that the invention may be embodied otherwise without departing from such principles.

What is claimed is:
1. A cam shaft assembly comprising:
   a shaft member having an outer diameter defined by an outer wall thereof;
   at least one cam member rigidly attached to said shaft member by a soldered connection, said cam member having an inner wall defining an axial bore extending therethrough with a cross-sectional profile corresponding to said outer wall of said shaft member and with a diameter which is slightly larger than said outer diameter of said shaft member sufficient to permit said shaft member to be placed to within said axial bore with a loose fit during assembly of said shaft member and said cam member;
   recess means formed within said axial bore on said outer wall of said shaft member; and
   joinder means including solder located within said recess means for fixing said cam member and said shaft member together, said joinder means comprising an annular piece having solder receptor means therein for holding the solder during assembly of said shaft member and said cam member, said annular piece being constructed from an axially split spring steel strip, said spring steel strip being formed with a corrugated configuration, said solder receptor means being axially extending concavities defined in said spring steel strip within which solder may be introduced and retained during heating of said joinder means to effect joinder of said cam member and said shaft member, said annular piece having an outer diameter when located within said recess means which is slightly larger than the diameter of said axial bore in said cam member so as to effect a press fit with said cam member during assembly thereof with said shaft member.

* * * * *